(12) United States Patent
Kasin

(10) Patent No.: US 8,354,005 B2
(45) Date of Patent: Jan. 15, 2013

(54) MICROWAVE GASIFICATION, PYROLYSIS AND RECYCLING OF WASTE AND OTHER ORGANIC MATERIALS

(76) Inventor: Kjell Ivar Kasin, Notodden (NO)

( * ) Notice: Subject to any disclaimer, the term of this patent is extended or adjusted under 35 U.S.C. 154(b) by 799 days.

(21) Appl. No.: 11/883,446

(22) PCT Filed: Feb. 2, 2005

(86) PCT No.: PCT/NO2005/000038
§ 371 (c)(1),
(2), (4) Date: Jun. 27, 2008

(87) PCT Pub. No.: WO2006/083168
PCT Pub. Date: Aug. 10, 2006

(65) Prior Publication Data
US 2009/0000938 A1 Jan. 1, 2009

(51) Int. Cl.
C10B 53/00 (2006.01)
C10B 19/00 (2006.01)
C10B 7/06 (2006.01)

(52) U.S. Cl. ............... 201/2.5; 201/19; 201/32; 202/98; 202/117; 202/266

(58) Field of Classification Search .................... 201/2.5, 201/19, 25, 32; 202/97, 98, 100, 136, 117, 202/262, 266, 269; 219/700, 701; 585/240, 585/241
See application file for complete search history.

(56) References Cited

U.S. PATENT DOCUMENTS

| 1,668,132 | A | * | 5/1928 | Trent | 201/10 |
| 2,091,702 | A | * | 8/1937 | Daniels | 202/98 |
| 2,247,185 | A | * | 6/1941 | Caccioppoli | 201/32 |
| 3,085,947 | A | * | 4/1963 | Tufty | 201/20 |
| 3,843,457 | A | | 10/1974 | Grannen | |
| 4,037,070 | A | | 7/1977 | Kirpichnikov | |
| 4,647,443 | A | | 3/1987 | Apffel | |
| 5,084,141 | A | | 1/1992 | Holland | |
| 5,330,623 | A | | 7/1994 | Holland | |
| 5,366,595 | A | | 11/1994 | Padgett | |
| 5,447,077 | A | | 9/1995 | Lastenschlaeger | |
| 5,882,484 | A | * | 3/1999 | Pyy | 202/262 |
| 2003/0009067 | A1 | * | 1/2003 | Bouziane et al. | 585/240 |

FOREIGN PATENT DOCUMENTS
EP 0628332 12/1994
GB 1470345 4/1977
WO WO 94/18286 8/1997

* cited by examiner

Primary Examiner — Jill Warden
Assistant Examiner — Joye L Woodward
(74) Attorney, Agent, or Firm — Christian D. Abel

(57) ABSTRACT

Apparatus for the destructive reclamation of materials and energy from municipal wastes and other raw materials through the use of Microwave induced Gasification and Pyrolysis, where the waste or raw material may be circulated once or several times through the process thus enabling the programming of different processes to differing materials and desired end products. The form employed being linear, circulating conveyors or rotating carousels that may carry trays or crucibles, some of which may be equipped with linings that absorb microwaves to enable the early charring of materials that do not initially absorb microwaves and thus will not heat up on their own.

17 Claims, 2 Drawing Sheets

MICROWAVE GASIFICATION, PYROLYSIS AND RECYCLING OF WASTE AND OTHER ORGANIC MATERIALS

TECHNICAL FIELD OF THE INVENTION

The invention relates to the application of pyrolysis to waste to reclaim matter or energy from that waste.

BACKGROUND OF THE INVENTION

The recycling of different materials and the conversion of the energy contents of waste becomes ever more relevant and the target of large scale investments, private as well as public. The procedure used normally is to pre-sort those materials found in the municipal waste which may be recycled. What remains are materials that may be converted into energy through, for example, incineration.

The problem of waste accumulation grows steadily. It is expensive both in terms of collection costs and fees charged, and is particularly unacceptable in terms of the valuable resources that are wasted.

Incineration is a common method for retrieving energy from waste that can not be recycled. The energy is usually converted into heat in the form of hot water or steam that subsequently may replace "nobler" forms of energy.

Hierarchically, electricity in the form of alternating current is the most valuable form of energy, as it may, at low cost, be converted into practically any other form of energy.

The cost of converting the energy contents of waste into electric power through incineration is, however, very high, usually requiring large plants if conversion is to yield a good financial return. The high costs are the result particularly of very strict public regulations regarding the release of polluting emissions into the atmosphere.

Pyrolysis is known traditionally as the conventional retort dry distillation process utilising an external source of heat, sometimes combined with partial combustion of the contents in the retort. Examples of such processes are the production of wood-tar/charcoal and coke from wood and coals respectively. In modern plants, pyrolysis may be best known as what the petrochemical industry refers to as "cracking."

Even after the invention of the magnetron in 1921, which used radio tubes to create the microwaves (MW), it took a quarter of a century before MW generators reached the market and came into practical use. In the post-WWII period, MW processes have found multiple applications within industries and in private households.

MW technology allows for the conversion of waste into electricity and other energies in smaller units than used in conventional incineration because of the minute quantities of air involved in the process. This results in considerably smaller volumes of gasses and vapours per unit of energy gained, as compared with incineration.

Pyrolysis is the equivalent of dry distillation and involves the decomposition of materials at a precisely controlled temperature, with or without precisely controlled quantities of oxygen, air or other additives for the enhancement of the process. This enables the extraction of valuable chemicals from the waste that would otherwise have been destroyed had the waste been burned.

The fractionated component materials that may be obtained through microwave pyrolysis (MWP) fall roughly into five categories.

1—Non-condensing volatile gas, which in many cases may be utilised directly as fuel in an IC engine/gas turbine to generate electricity after only simple cooling, rinsing and filtering.

2—Liquids, which may be utilised as fuel oils or, after fractional condensation, may represent raw materials of interest to chemical industries.

3—Carbon. This is the charred end product of organic waste which may be further processed into activated charcoal, be utilised as a reducing agent in metallurgical processes, or be used as a solid fuel whose flue gas emissions are exceptionally clean.

4—Metals, such as the metal cording from shredded automobile tires, will after MWP maintain their strength and resilience and may be added to reinforced concrete or plastics. Had the steel been exposed to ordinary incineration, it would have become oxidised and would thereby have lost its value both as an additive and as a raw material. Copper from electric cables and metals from electronic waste are other examples of recovered metal.

5—Ashes. Metals and minerals may in many instances be re-circulated by being separated from the ash fraction after MWP. Examples of such recycling are the recovery of chrome from tanning industry waste and of silver from exposed x-ray films.

A disadvantage of conventional dry distillation or pyrolysis is that, for the most part, the heat for the raw materials must come from outside the retort. This delays the heat transfer and leads to uneven decomposition temperatures inside the retort.

In MWP the heating takes place by volume inside the raw material or the waste itself. Thus, a considerably more efficient conversion may take place as compared to retort pyrolysis. The process temperature may be controlled to within narrow parameters. The state of the art is such that retort pyrolysis by batch as well as continuous MWP using linear conveyors are available technologies.

The known methods are, however, relatively inflexible if the raw material is of varying consistency and properties. Certain materials resist being heated as they will not absorb MW. These materials have to be heated indirectly, often by mixing shredded MW-inert material together with MW-absorbing material such as carbon, or other MW-reactive materials.

Decomposition of materials and MW absorbing waste through MWP has been known for many years, and is referred to in several patents, such as: U.S. Pat. No. 3,843,457 & U.S. Pat. No. 5,330,623.

Fractional condensation for the extraction of volatile and liquid components is referred to in U.S. Pat. No. 3,843,457.

Mixing of materials that do not absorb MW with granulated carbon or other MW absorbent materials is referred to in Norwegian patent application: NO-1995,2652.

Preheating of raw materials with infrared light (IR), prior to MWP is referred to in U.S. Pat. No. 5,084,141 and U.S. Pat. No. 4,647,443.

The use of inert gas in the pyrolysis chamber to prevent oxidisation of the raw materials is referred to in U.S. Pat. No. 5,084,141.

A straight conveyor for the transport of the raw materials for decomposition through a tunnel is likewise referred to in U.S. Pat. No. 5,084,141.

Full or partial use of volatile, flammable gas components from MWP for the preheating of raw materials or wastes is referred to in U.S. Pat. No. 5,084,141.

The generating of electricity through the use of volatile flammable gases used directly as motor fuel after filtering has been described in several sources and has been utilised in industrial processes.

MW technology has been, is and will be used in such industrial plants and processes as The sterilising and/or destruction of infectious material as: prions, fungi spores, viruses, bacteria and other undesirable micro-organisms.

The sterilising and/or decomposition of liquid organic waste such as: sludge from sewage plants, and oil-polluted sludge from petrochemical drilling.

Recovering of metals, salts or minerals, such as chrome from tanning industry waste.

Recycling and recovering of waste components found in municipal wastes such as: energy, plastics and glass.

Decomposition or destruction of "problem wastes," such as: PCB, dioxin, anti-fouling for ships hulls, paints, etc.

Recycling of chemicals and energy from plastics and rubber products, such as: automobile tires and electronic products.

Energy production from compressed agricultural waste, such as: straw

Hardening processes for organic adhesives, steels and different mineral compositions.

Welding operations for thermoplastics.

It may appear after the above summary that MWP is a fully developed technology and that there no longer is room for improvement. That, however, is only how it seems at first glance. If one hoped to acquire full scale equipment for, for example, the treatment or decomposition of large quantities of tar impregnated railway sleepers or for the recycling of automobile tires on a large scale, one would discover that there is no such commercially operative equipment available to treat these problematic wastes, none with the capacity adapted to the magnitude of the problem.

BRIEF SUMMARY OF THE INVENTION

According to the invention, microwave pyrolysis is utilised in a process where the material to be treated is brought into a circulating conveyor system consisting of several straight conveyors or one or several rotating carousel-type conveyors enabling transport of the raw material or a number of crucibles containing such raw material or waste in a circulating path, thus enabling a varied predetermined treatment program for each quantity of material. The circulation may take place at different speeds, continuously or intermittently or even in reverse. Around the carousel or along the linear conveyors are placed stations for specific equipment that will be programmed to give individualised treatment to the circulating materials. To obtain an inert atmosphere when desired, appropriately small quantities of water are injected into the crucibles or the protecting container that surrounds the carousel or the conveyors. Further auxiliary equipment is positioned radially for the programmed sluicing in and out of crucibles of specialised treatments. The volatile gases are led out of the pyrolysis zone for further treatment or to fuel internal combustion engines or gas turbines for the production of electricity, while the vapours are led into fractional condensation in a separate column. The residue in the circular tray or crucibles, usually in the form of charred organic matter, may be utilised as fuels or raw material for later activation or reduction purposes.

The invention provides apparatus for the reclamation of matter and/or energy from waste or other raw material in solid or liquid form through the use of microwave induced pyrolysis or evaporation, and comprising means of non conductive material to transport waste around a continuous path within a closed airtight container, microwave generating equipment disposed to heat the waste as the waste moves around that continuous path, and provision to remove solid matter and/or to allow extraction of liquid and/or to allow escape of gas, from the closed airtight container after the application of microwave energy.

In this context, the word 'evaporation' is intended to mean the conversion of liquids or solids into vapour or gas.

The means to transport waste may be a carousel, or may be a succession of conveyor belts.

It is preferred that the means to transport waste around the continuous path is wholly within the closed airtight container.

In this preferred form, the waste may be carried on one or more open trays, or may be carried in one or more closed crucibles with provision to allow the escape of gas from the crucible(s) into the closed airtight container.

Advantageously, there is means to recover gas generated by pyrolysis of waste within the closed airtight container, and there may be additional equipment to generate usable energy from the gas so recovered.

It is preferred that there is equipment to recover usable energy from the solid matter removed and/or liquid extracted from the closed airtight container.

In embodiments in which the means to transport waste round the continuous path is wholly within the closed airtight container, it is preferred that there is provision for water to be introduced into the closed airtight container, whereby an initial phase of microwave heating will generate steam to displace air from within the closed airtight container or will reform steam to hydrogen and carbon monoxide from within the closed airtight container.

It is preferred that there are individual crucibles penetrable by microwaves to contain waste to be transported around the continuous path, and the individual crucibles comprise individual closed containers.

In this preferred form it is further preferred that an individual crucible has a specific window portion which is penetrable by microwaves.

It is also preferred that there is an airlock arranged for the introduction of crucibles into or removal of crucibles from the means to transport waste around the continuous path.

It is preferred that there is provision to locate more than one item of auxiliary equipment adjacent to the continuous path, and attachments for all such items of auxiliary equipment are identical.

The invention also provides a method of reclaiming matter and/or energy from waste or other raw material in solid or liquid form through the use of microwave induced pyrolysis or evaporation, including the steps of:—transporting waste around a continuous path within a closed airtight container, applying microwave energy to the waste as it moves around that continuous path, and recovering solid matter and/or allowing extraction of liquid and or allowing escape of gas, from within the closed airtight container after the application of microwave energy.

It is preferred that the method includes the step of transporting waste around the continuous path on two or more occasions.

It is further preferred that the velocity of the waste around the continuous path can be varied or reversed at will.

It is still further preferred that the method includes the step of adding catalyst to the waste prior to the application of microwave energy.

The method may include the step of introducing a controlled amount of water before the application of microwave energy for conversion to steam and so to displace air from the closed airtight container through suitable valve means, or so that steam combined with carbon may be reformed into hydrogen and carbon monoxide.

The method may include the step of lining containers for the waste with a substance that absorbs microwaves to enable early charring of waste that does not initially absorb microwaves, and thus will not heat up on its own.

Different processes may be applied to the waste by pyrolysis during earlier and later steps of transportation around the continuous path.

DETAILED DESCRIPTION

Figure 2:
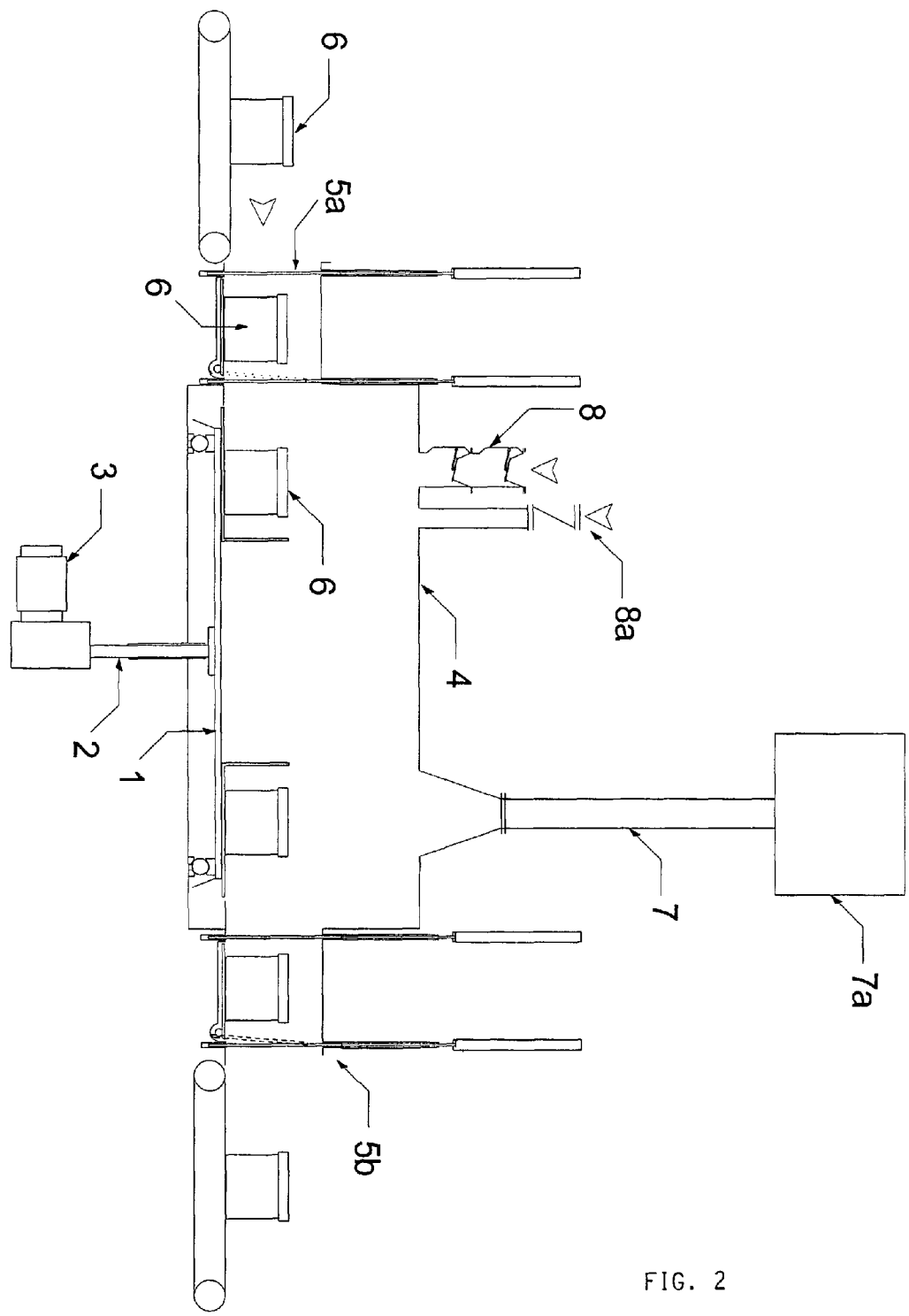
FIG. 2 is a diagrammatic cross-section on diameter of the carousel shown in FIG. 1.

According to one aspect of the invention, a carousel 1 is rotatable on a vertical shaft 2 driven by an electric motor 3 (FIG. 2). The carousel is disposed close to the base of a closed airtight cylindrical container 4. Feeding airlock 5a permits the insertion of crucibles 6 into the closed airtight container 4, and discharge airlock 5b permits removal of those crucibles after processing. Ports 7 allow the application of microwave energy from generators 7a to heat material in the crucibles 6 within the closed airtight container 4. Solid additives (e.g. catalysts) may be introduced into the closed airtight container 4 through an airlock 8, and liquid additives may be introduced through a liquid feed device 8a.

Figure 1:
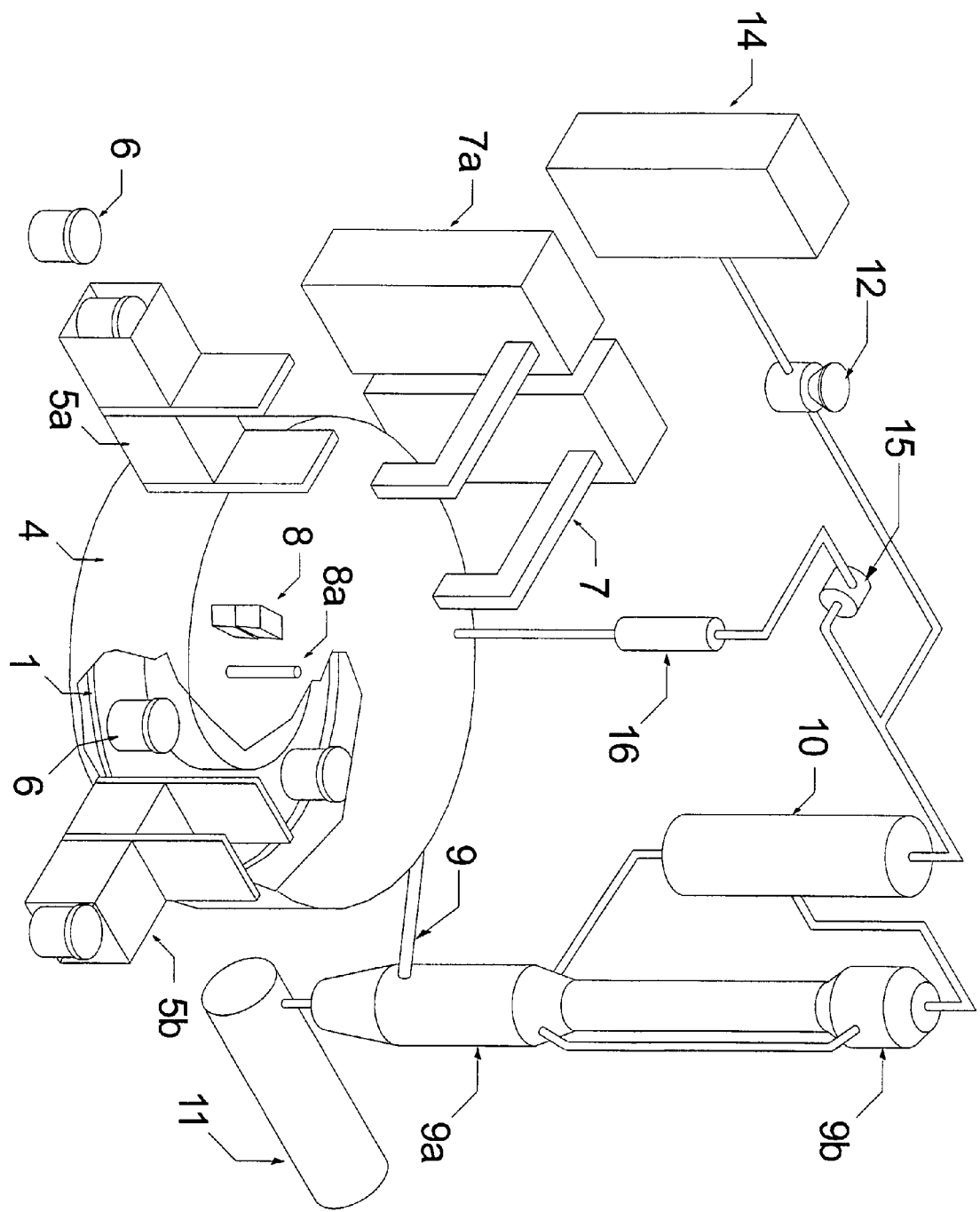
FIG. 1 is a diagrammatic perspective view of a carousel illustrating the invention.

As shown in FIG. 1 (but not in FIG. 2) vent 9 allows the removal of gases generated by the microwaves. Gases pass to a distillation column 9a, a condenser 9b, and to scrubber 10. An oil storage tank 11 receives oil condensed from the distillation column 9a.

Gas from the top of the scrubber 10 may pass through a pressure valve 12, to a gas engine 14; or may pumped by a gas re-circulation fan 15 through a gas reheater 16 into the container 4.

This embodiment is developed to solve a series of the practical difficulties that are encountered in the presently available systems for MWP. Special focus is aimed at concentrating and precisely controlling the processes beyond present day possibilities, whether these be intermittent or continuous.

The principle of the invention may be applied in the form of a series of straight conveyors enabling the transporting of the raw material or, as shown, as one or more carousel-type circular conveyors 1 that transport raw materials in a circular tray in a closed airtight container 4 within a neutral atmosphere, preferably created by the injection of precise quantities of water whereby steam, at atmospheric pressure will displace air from the process or where the raw materials are portioned into lidded ceramic crucibles 6 that may be airlocked into and out of the container. The ceramic crucible lids are provided with MW penetrable "windows" that enable the MWP to take place within the closed crucible. The circular tray of the carousel 1 or some of the crucibles 6 may be lined with sintered graphite, silica carbide or other MW absorbing materials so that those raw materials that are not themselves MW absorbing may, nonetheless, be heated until pre-charred.

A main advantage of the embodiment is the possibility for individualised treatment of raw materials at different sections or stations allowing crucibles with differing contents to be programmed to totally different temperatures; some materials may circulate for longer periods of time, travelling several rounds while other materials may only receive one round.

One crucible might, for example, be given a sterilising temperature of 120 C and circulate one round while another is exposed during 5 rounds reaching a decomposition temperature of 900 deg C. The gases and vapours emitted from the trays or crucibles are led to an initial cooling tower for the straight condensation or fractional condensation of the vapours while the volatile gases may be used as fuel for internal combustion engines or gas turbines after simple rinsing and filtering, or to fuel the direct heating of water or steam.

One or more MW magnetrons may be positioned radially around the carousel or in two lines along a straight section of the circulating conveyors. This provision will ease the access and exchange of the auxiliary equipment. All items of auxiliary equipment are anchored identically at all stations, thus enabling the easy and quick exchange of units with varying programmes and/or easy maintenance of the active stations.

One preferred form, in which a circular carousel is provided with a protective, container, is also well suited to prevent leakage of MW into the surroundings.

Linear, circulating conveyors open up for a doubling of the capacity. In such cases, large quantities of similar raw material requiring practically identical treatment may be run through the conveyors in parallel in the same or opposite directions.

If the raw material is very porous and therefore contains considerable quantities of free air, precise quantities of water may be injected into the central area of the preferably compressed raw material. During the early stages of heating, before the gasification and the vaporisation of the solids, the water will rapidly respond to the MW and the steam will displace about 800 liters of air per liter of water without introducing nitrogen or other gases into the processes. Water will not introduce any undesired alien material that could cause any chemical interactions or complicate those taking place, but, rather, will enable the introduction of dissolved catalysts or other planned chemical additives.

The use of crucibles may also make the optimal mixing of different raw materials easier, thus improving the end results of the processes.

This method, using crucibles and trays, will make it easier to use specific doses of catalysts, whether in liquid, solid or pelletised form, and thus facilitate special or more rapid results in certain processes. It also makes it convenient for one or more stations to be able to inject additives to enhance certain processes.

The crucible method also meets the challenge of cases in which it is desirable for the residue or ash to be kept separate from other residue, as in the case pet cremation.

At municipal waste sites, it may be convenient to use the crucibles to transport materials from the sorting centre to the MWP plant. In such cases, the waste may be vacuum packed in plastics to provide easier and more hygienic handling.

If the waste is either in liquid form or is very wet, the crucible method allows it to be totally or partially absorbed into other more porous waste.

The crucible and carousel method will minimise cleaning and maintenance procedures by making the trays and crucibles easily exchangeable, thus making it unnecessary to stop the plant for such procedures. As the processes are carried out within such limited spaces as inside the crucibles or trays, most of the upkeep may be integrated into regular daily routines. In addition, different residue products may easily be kept separate for subsequent processing, as in the case of ashes containing chromium in waste from the tanning industry.

ADVANTAGES OF THE INVENTION

The starting up and closing down of the processes are almost instantaneous.

The heating takes place by volume inside the material, not from the outside.

The process temperature may be controlled to within narrow parameters.

No catastrophe can result in case of a power failure as the materials in process will simply rest until power is restored.

The risk of fire or explosion in the resulting gases is greatly diminished due to there being only a minimal amount of air present during all stages.

In all forms of the incineration, gasification and pyrolysis of waste, the control of critical parameters is both important and at the same time complicated. This applies to the process itself as well as to issues of temperature, false air, fire and explosion risks, radiation and emissions into the atmosphere, and run-off into rivers lakes and oceans.

Among the various waste handling processes, MWP holds many potential advantages. For example, because the amount of air is minimal, little or no fly ash and flue gases need to be filtered, cleansed or scrubbed, removing thereby the need for costly equipment and additives.

The invention claimed is:

1. A method for the continuous microwave pyrolysis of waste materials or other raw materials, comprising the steps of:
   a. inserting one or more waste containers containing waste material into a closed airtight outer housing through a first airlock,
   b. continuously transporting the waste material in continuous path on a circulating conveyor system in the form of a rotating carousel within the closed airtight outer housing,
   c. applying microwave energy to the waste material as it transported on the conveyor system at fixed heating stations,
   d. recovering solid matter and/or extracting liquid from within the closed airtight housing after the application of microwave energy through a second airlock,
   e. recovering gas from the airtight outer housing.

2. The method according to claim 1, further comprising introducing a solid additive to the waste material while said waste material is transported on the conveyor system.

3. The method according to claim 1, further comprising introducing a liquid additive to the waste material while said waste is transported on the conveyor system.

4. The method according to claim 1, wherein the waste material is transported around the continuous path from two times up to five times.

5. The method according to claim 1 further comprising the step of selectively varying or reversing the velocity of the waste material around the continuous path.

6. The method according to claim 1, further comprising the step of adding catalyst to the waste material prior to the application of microwave energy.

7. The method according to claim 1, further comprising the step of introducing a controlled amount of water before the application of microwave energy for conversion to steam and so to displace air from the closed airtight outer housing through suitable valve means.

8. The method according to claim 1, further comprising the step of introducing a controlled amount of water before the application of microwave energy, so that steam combined with carbon may be reformed into hydrogen and carbon monoxide.

9. The method according to claim 1, in which different processes are applied to the waste by pyrolysis during earlier and later steps of transportation around the continuous path.

10. An apparatus for the continuous microwave pyrolysis of waste materials or other raw materials, comprising
    a. A closed airtight outer housing,
    b. A circulating conveyor system made of a material non-conductive to microwaves arranged inside the airtight outer housing, the conveyor system arranged for the introduction and removal of waste containers filled with waste material by the use of airlocks, and transport waste containers in a circuitous path within the airtight housing,
    c. A first airlock arranged to permit the introduction of waste containers onto the conveyor system,
    d. A second airlock arranged to permit the removal of waste containers from the conveyor system,
    e. One or more apparatus for generating microwave radiation, arranged to apply such radiation to waste containers at fixed heating stations along the path of the conveyor system,
    f. A common gas outlet for the removal of gasses from the inside of the airtight outer housing.

11. The apparatus according to claim 10, comprising a plurality of fixed heating stations, each programmed to heat waste containers at a different temperature.

12. The apparatus according to claim 11, wherein the stations are programmed to provide individualized treatment to waste containers according to the type or quantity of materials within a specific waste container.

13. The apparatus according to claim 10 wherein the conveyor system is a rotating carousel.

14. The apparatus according to claim 10, further comprising a third airlock adapted to permit the introduction of solid additives to waste containers while such containers travel along their circuitous path.

15. The apparatus according to claim 10, further comprising a liquid feed port adapted to permit the introduction of liquid additives to waste containers while such containers travel along their circuitous path.

16. The apparatus according to claim 10, wherein the apparatus is arranged to receive waste containers in the form of closed crucibles having a window potion that has increased permeability to microwave radiation.

17. The apparatus according to claim 10, wherein the apparatus is arranged to receive waste containers in the form of open trays.

* * * * *